United States Patent Office 3,532,657
Patented Oct. 6, 1970

3,532,657
STABILIZED POLYMERIC AMINES
Clarence R. Dick and Juan Longoria III, Lake Jackson, Tex., assignors to The Dow Chemical Company, Midland, Mich., a corporation of Delaware
No Drawing. Filed June 27, 1966, Ser. No. 560,820
Int. Cl. C08g 51/56
U.S. Cl. 260—29.2
12 Claims

ABSTRACT OF THE DISCLOSURE

Polymeric amines are stabilized against degradation and discoloration through the use of a sulfite or bisulfite stabilizing agent.

BACKGROUND OF THE INVENTION

The present invention relates to stabilized polymeric amine compositions. More particularly, it relates to polymeric amines stabilized against degradation and discoloration through the use of a sulfite or bisulfite stabilizing agent.

It is known that polymeric amines both degrade and discolor in the presence of acids or oxidants or combinations thereof. When this occurs, the utility of the polymeric amine suffers, and many times the polymeric amine does not function at all for its intended utility, for example, as a flocculating agent.

The art has attempted to provide a simple stabilizer for polymeric amines. Typical in this regard in U.S. Pat. 2,242,484, issued May 20, 1941, which discloses the use of ethyl alcohol to stabilize aqueous solutions of amino resins formed as the condensation product of urea and formaldehyde. Suitable stabilizing agents must perform the stabilizing function without altering the properties of the polymeric amine essential for its intended purpose.

SUMMARY OF THE INVENTION

It has now been discovered that polymeric amines such as alkylenepolyamines, polyalkylenepolyamines and polyalkylenimines, may be stabilized against degradation from strong acids and oxidants which liberate H+ ions by incorporating into the polymeric amines from about 0.1 to about 20 weight percent, polymeric amines basis, of sulfite or bisulfite ions. Excess sulfite or bisulfite ions may be present without detrimental effect. Polymeric amine compositions thus treated remain substantially unchanged in their intended activity. The present invention is particularly useful for, but not limited to, the stabilization of polymeric amines which have been modified with acids or oxidants which liberate H+ ions, either directly or indirectly.

Polymeric amines which may be stabilized according to the present invention include alkylenepolyamines, polyalkylenepolyamines, and polyalkylenimines (hereinafter PAIs). Suitable alkylenepolyamines include ethylenediamine, propylenediamine and butylenediamine. Suitable polyalkylenepolyamines include diethylenetriamine, triethylenetetramine, tetraethylenepentamine, pentaethylenehexamine, and the analogous propylene polyamines and the butylene polyamines. Higher molecular weight polyalkylenepolyamines, e.g. those having molecular weights up to 200,000 and higher may also be stabilized according to the present invention. These polyalkylenepolyamines (hereinafter PAPA) may be prepared by polymerizing the alkylenepolyamines listed above through a condensation reaction with, for example, a divalent organic compound such as 1,2-dichloroethane.

PAIs which may be stabilized according to the present invention include polyethylenimine (hereinafter PEI), polypropylenimine, and polybutylenimine having molecular weights from under 1,000 to 1 million and higher. Methods for preparing such PAIs are known in the art. The polymerization of alkylenimines has been reviewed by Jones, "The Polymerization of Olefin Imines" in P. H. Plesch, ed., The Chemistry of Cationic Polymerization, New York, MacMillan (1963), pages 521–534.

The preferred polymeric amines for stabilization according to this invention are the PAPAs and PAIs having molecular weights between about 5,000 to about 500,000.

A variety of materials which liberate H+ ions, either directly or indirectly, have been used to modify the polymeric amines listed above. Such materials include acids, such as hydrochloric acid, sulfuric acid, and the like; the halogens, such as fluorine, chlorine, bromine, and iodine; such compositions as epichlorohydrin, as disclosed in British Pat. 1,008,464, published Oct. 27, 1965; and the like. The factor which such modifiers have in common is that they cause the liberation of H+ ions which cause discoloration and oxidation of the polymeric amines. The present invention is particularly useful for stabilizing acid- or epichlorohydrin-modified polymeric amines.

In general, any source of sulfite or bisulfite ions is suitable for preparing the stabilized polymeric amines of the present invention. Thus, suitable stabilizing agents include sulfur dioxide, sulfurous acid, the water-soluble alkali metal, alkaline earth metal, or ammonium sulfites or bisulfites, such as sodium sulfite, sodium bisulfite, potassium sulfite, potassium bisulfite, lithium sulfite, lithium bisulfite, magnesium sulfite, magnesium bisulfite, calcium bisulfite, ammonium sulfite, ammonium bisulfite, and the like. The preferred stabilizer is sodium bisulfite.

The stabilizer should be present in an amount sufficient to provide from about 0.1 to about 20 percent by weight, polymeric amine basis, of the sulfite or bisulfite ions. At least about 0.1 percent by weight is necessary to give adequate stabilizing effect. More than 20 percent by weight may be added without detrimental effect. For most polymeric amines and modified polymeric amines, from about 1 percent by weight to about 10 percent by weight of the sulfite or bisulfite ions is preferred.

In practice, the stabilized compositions of the present invention are prepared by merely adding the stabilizer to the polymeric amine in the amounts indicated above and mixing thoroughly by conventional means.

SPECIFIC EMBODIMENTS

The following examples describe completely representative specific embodiments and the best modes contemplated by the inventors for practicing the invention claimed. The scope of the invention is, however, limited only by the claims appended hereto.

Example 1

The stabilization effect of sodium bisulfite on a water solution containing 5 weight percent of a PAPA having a molecular weight of about 50,000 and prepared by polymerizing diethylenetriamine by condensation with 1,2-dichloroethane was evaluated by measuring the viscosity of such solutions.

A five weight percent water solution of such PAPA gives a reading of 23.5 seconds when run through a Cannon-Finske viscosity tube at 100° F. A quantity of 25 ml. of a 10 percent by weight water solution of this PAPA is mixed with 25 ml. of water saturated with chlorine gas. The viscosity is determined at various time intervals after the addition of chlorine water. The chlorine causes degradation as shown by the viscosity changes indicated in Table I below.

TABLE I

Change in viscosity of unstabilized PAPA in presence of chlorine

| Time after chlorine addition, min.: | Viscosity, seconds |
|---|---|
| 10 | 15.3 |
| 12 | 14.7 |
| 15 | 12.0 |
| 45 | 6.4 |
| 120 | 4.6 |

A quantity of 25 ml. of a second 10 percent by weight water solution of the same PAPA but containing 1 g. of sodium bisulfite is mixed with 25 ml. of water saturated with chloride gas. There is no appreciable viscosity change in this PAPA solution after 2 hours. Substitution of sodium sulfite and ammonium bisulfite in the above composition gives a similar stabilized polyamine solution.

Example 2

The effect of chlorine on the flocculating properties of the PAPA of Example 1 when stabilized and when unstabilized is evaluated. Water suspension containing 5 percent by weight starch are placed in cylindrical settling vessels. A quantity of 5 parts per million of the PAPA is added per 100 ml. of starch suspension. Mixing is accomplished by repeated inversions of the settling vessels. All of the cylinders are brought to an upright position to initiate sedimentation. The effect of the PAPA on settling rates is measured by recording the time required for the solid-liquid interface to settle three inches in the cylinder. The results obtained are shown below in Table II.

TABLE II.—FLOCCULATION ACTIVITY OF STABILIZED AND UNSTABILIZED PAPA

| Mixture | Time after mixing, hrs. | Flocculation rate, in./min. |
|---|---|---|
| PAPA | | 7 |
| PAPA plus Cl$_2$ [a] | 1 | (d) |
| PAPA plus NaHSO$_3$ [b] | 0 | 6.9 |
| PAPA plus NaHSO$_3$+Cl$_2$ [c] | 1 | 6.9 |
| | 24 | 6.5 |

[a] .0025 g. Cl$_2$/1 g. PAPA.
[b] .01 g. NaHSO$_3$/1 g. PAPA.
[c] 1 g. PAPA, .01 g. NaHSO$_3$ and .0025 g. Cl$_2$.
[d] No flocculation The above table shows that unstabilized PAPA has no flocculating activity one hour after mixing with chlorine. In contrast, the stabilized PAPA retains substantially all of its flocculating activity 1 hour and 24 hours after mixing with chlorine. A similar stabilizing effect is observed when sulfur dioxide or sulfurous acid is substituted in equivalent amounts for the sodium bisulfite.

Example 3

The use of sodium bisulfite as a color inhibitor for PEI modified with epichlorohydrin is evaluated. The samples evaluated are 10 percent by weight water solutions of a condensation product of a PEI having a molecular weight of about 50,000, as determined by ebullioscopy, and epichlorohydrin. Varying amounts of the sodium bisulfite are added to the PEI-epichlorohydrin solution. The solutions are aged at 40° C. to determine their shelf-life stability, followed by a determination of wet strength activity of the polymers on kraft paper pulp. The effect of the sodium bisulfite as a color inhibitor is shown by the following table.

TABLE III.—STABILITY OF PEI-EPICHLOROHYDRIN ADDUCT

| Amount NaHSO$_3$ added, wt. percent, PEI basis | Color after 16 days at 40° C. | Color after 2 months at 40° C. |
|---|---|---|
| 0 | Yellow | Strongly yellow. |
| 2 | Colorless | Yellow. |
| 4 | do | Slightly yellow. |
| 8 | do | Do. |
| 16 | do | Colorless. |

There is no loss in wet strength activity in the samples containing sodium bisulfite. The data shows that sodium bisulfite is an effective color inhibitor for a PEI-epichlorohydrin adduct with no effect on wet strength activity.

Example 4

A water solution of a PAPA of about 50,000 molecular weight as determined by ebullioscopy and prepared by the polymerization of diethylenetriamine with 1,2-dichloroethane is evaluated when the pH of the water solution is varied by the addition of increasing amounts of aqueous HCl. The starting composition of the water solution is 37 percent by weight active polymer, 13 percent by weight HCl, 5 percent by weight NaCl, and 45 percent by weight water. Additional amounts of HCl are added to vary the pH. The results obtained with the unstabilized PAPA solution are shown below in Table IV. In the table, the relative color obtained is indicated on a numerical scale of from 1 to 10, where 1 indicates yellow, 5 indicates red-brown, and 10 indicates dark brown.

TABLE IV.—COLOR OF UNSTABILIZED ACIDIFIED PAPA

| Wt. percent PAPA in water | pH | Relative color |
|---|---|---|
| 16.7 | 8 | [1]1 |
| 16.7 | 7.5 | 2 |
| 16.7 | 7 | 2 |
| 16.7 | 7 | 3 |
| 16.7 | 6 | 4 |
| 25.0 | 5.5 | [2]5 |
| 16.7 | 5 | 6 |
| 16.7 | 4 | 7 |
| 16.7 | 1.5 | 9 |
| 16.7 | 1 | [3]10 |

[1] Yellow.
[2] Red-brown.
[3] Dark brown.

The polymeric product as tested above is then evaluated with the addition of 3 percent by weight sodium bisulfite before the addition of HCl. The PAPA has a relative color of 1 when thus stabilized, even at a pH as low as 1. Substitution of ammonium, magnesium, potassium, and calcium sulfites and bisulfites gives a similar color inhibition.

What is claimed is:

1. A composition of matter stabilized against oxidation and discoloration consisting essentially of (a) a polyethylenepolyamine or polyalkylenimine, and (b) a stabilizing amount of from about 0.1 to about 20 weight percent, polyethylenepolyamine or polyalkylenimine basis, of sulfite or bisulfite ions.

2. A composition as claimed in claim 1 wherein the sulfite or bisulfite ions are provided by sulfur dioxide, sulfurous acid, or by the water-soluble sulfite or bisulfite or an alkali metal, an alkaline earth metal, or ammonia.

3. A composition as claimed in claim 1 wherein the polyethylenepolyamine or polyalkylenimine has a molecular weight between about 5,000 and about 500,000.

4. A composition as claimed in claim 1 wherein (a) is polyethylenimine.

5. A composition as claimed in claim 4 wherein the polyethylenimine has a molecular weight between about 1,000 and about 1,000,000.

6. A composition as claimed in claim 1 wherein (a) is polyethylenepolyamine.

7. A water solution of the composition of claim 1, said water solution containing from about 5 to about 50 weight percent of polyalkylenepolyamine, or polyethylenepolyamine.

8. A composition as claimed in claim 1 additionally comprising a source of H+ ions.

9. A composition as claimed in claim 8 wherein the source of H+ ions is HCl, chlorine or epichlorohydrin.

10. A composition as claimed in claim 9 wherein said polyethylenepolyamine or polyalkylenimine has a molecular weight between about 5,000 and about 500,000.

11. A process for stabilizing a polyethylenepolyamine or polyalkylenimine which comprises adding to said polyethylenepolyamine or polyalkylenimine from about 0.1 to about 20 weight percent, polyethylenepolyamine or polyalkylenimine basis, of sulfite or bisulfite ions.

12. A process as in claim 11 wherein the source of sulfite or bisulfite ions is sulfur dioxide, sulfurous acid, or by the water-soluble sulfite or bisulfite of an alkali metal, alkaline earth metal, or ammonia.

References Cited

UNITED STATES PATENTS

| 2,872,433 | 2/1959 | Glickman | 260—45.7 |
| 2,960,486 | 11/1960 | Pye | 260—45.7 |
| 3,037,835 | 6/1962 | Bonvicini et al. | 260—2 |
| 3,248,353 | 4/1966 | Coscia | 260—29.2 |
| 3,282,879 | 11/1966 | Werner | 260—29.6 |
| 3,240,721 | 3/1966 | Foroyce | 260—2 |

MURRAY TILLMAN, Primary Examiner

M. J. TULLY, Assistant Examiner

U.S. Cl. X.R.

260—2, 45.7, 239